US011560101B2

(12) United States Patent
Salter et al.

(10) Patent No.: US 11,560,101 B2
(45) Date of Patent: Jan. 24, 2023

(54) HEADLINER-MOUNTED TELEMATICS CONTROL UNIT PACKAGE

(71) Applicant: Ford Global Technologies, LLC, Dearborn, MI (US)

(72) Inventors: Stuart C. Salter, White Lake, MI (US); Satyanarayana Raju Vemulapati, Westland, MI (US); Paul Kenneth Dellock, Northville, MI (US); John Budaj, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 16/950,007

(22) Filed: Nov. 17, 2020

(65) Prior Publication Data

US 2022/0153206 A1   May 19, 2022

(51) Int. Cl.
| | | |
|---|---|---|
| *B60R 11/02* | (2006.01) | |
| *B60R 11/00* | (2006.01) | |
| *B60R 13/02* | (2006.01) | |
| *B60R 13/08* | (2006.01) | |
| *H01Q 1/32* | (2006.01) | |

(Continued)

(52) U.S. Cl.
CPC .......... *B60R 11/02* (2013.01); *B60R 13/0212* (2013.01); *B60R 13/0815* (2013.01); *B60R 16/023* (2013.01); *H01Q 1/241* (2013.01); *H01Q 1/3275* (2013.01); *H04W 4/48* (2018.02); *B60R 11/0264* (2013.01); *B60R 2011/0028* (2013.01)

(58) Field of Classification Search
CPC ..... B60R 11/00; B60R 11/02; B60R 11/0264; B60R 2011/0028; B60R 13/0206; B60R 13/08156; H04W 4/48; H01Q 1/241; H01Q 1/3275

USPC ................. 296/211, 37.7, 39.3, 210, 214
See application file for complete search history.

(56) References Cited

U.S. PATENT DOCUMENTS 4,449,747 A   5/1984 Morgan et al.
4,646,210 A   2/1987 Skogler et al.
(Continued)

FOREIGN PATENT DOCUMENTS

JP      2005239133 A  *  9/2005   ......... H05K 7/20881
KR      100656030 B1  *  8/2006   ............... B60H 1/00
(Continued)

OTHER PUBLICATIONS

Matsui et al. "Overhead Module For Vehicle", Sep. 2005, Japanese Patent Office, Edition: JP2005239133A (Year: 2005).*
(Continued)

*Primary Examiner* — Dennis H Redder
*Assistant Examiner* — Joyce Eileen Hill
(74) *Attorney, Agent, or Firm* — Vichit Chea; Price Heneveld LLP (57) ABSTRACT

A roof structure of a motor vehicle includes an outer sheet and a headliner below the outer sheet. A telematics control unit (TCU) is disposed in an insulated space of the roof structure. The TCU is configured to provide Wi-Fi within a passenger space of the vehicle above an electrically non-conductive grille extending across an opening in the headliner. The grille permits airflow between the insulated space and a passenger space below the headliner to cool the TCU, without interfering with Wi-Fi signals from the TCU.

19 Claims, 7 Drawing Sheets

(51) Int. Cl.
*H01Q 1/24* (2006.01)
*H04W 4/48* (2018.01)
*B60R 16/023* (2006.01)

(56) References Cited

U.S. PATENT DOCUMENTS

| | | | |
|---|---|---|---|
| 5,357,408 A | 10/1994 | Lecznar et al. | |
| 5,681,883 A | 10/1997 | Hill et al. | |
| 5,754,664 A * | 5/1998 | Clark | H04R 5/02 |
| | | | 381/86 |
| 6,201,700 B1 | 3/2001 | Tzinares et al. | |
| 6,225,559 B1 | 5/2001 | Hubner et al. | |
| 6,487,073 B2 | 11/2002 | McCullough et al. | |
| 7,440,845 B1 * | 10/2008 | Laverick | G01C 21/265 |
| | | | 296/37.7 |
| 7,843,689 B2 | 11/2010 | Moore et al. | |
| 8,248,785 B2 | 8/2012 | Guan | |
| 10,242,509 B2 | 3/2019 | Throop et al. | |
| 10,318,247 B2 | 6/2019 | Tonshal et al. | |
| 10,523,565 B2 | 12/2019 | Lei et al. | |
| 10,547,502 B2 | 1/2020 | Makkiya et al. | |
| 10,705,820 B2 | 7/2020 | Madrid et al. | |
| 2004/0196179 A1 * | 10/2004 | Turnbull | G01S 5/0221 |
| | | | 343/711 |
| 2006/0065398 A1 | 3/2006 | Huang et al. | |
| 2006/0103161 A1 | 5/2006 | Harata et al. | |
| 2007/0041918 A1 | 2/2007 | Meneghetti et al. | |
| 2008/0049949 A1 * | 2/2008 | Snider | H05K 9/0007 |
| | | | 381/86 |
| 2011/0051972 A1 * | 3/2011 | Gratke | H04R 1/021 |
| | | | 381/361 |
| 2019/0283689 A1 * | 9/2019 | Bock | H05B 3/286 |

FOREIGN PATENT DOCUMENTS

| | | | |
|---|---|---|---|
| WO | 2006023860 A2 | 3/2006 | |
| WO | 2008024240 A2 | 2/2008 | |
| WO | WO-2018093987 A1 * | 5/2018 | H01L 23/3737 |

OTHER PUBLICATIONS

Oh, "Roof Duct Structure For Automobile", Aug. 12, 2006, Korean Patent Office, Edition: KR100656030B1 (Year: 2006).*

* cited by examiner

HEADLINER-MOUNTED TELEMATICS CONTROL UNIT PACKAGE

FIELD OF THE DISCLOSURE

The present disclosure relates to motor vehicles having telematics control units (TCUs) and, in particular, to the motor vehicle having a TCU mounted in a roof structure of the motor vehicle.

BACKGROUND OF THE DISCLOSURE

Various types of TCUs have been developed for motor vehicles. TCUs are typically connected to one or more antennas utilizing a coaxial cable or the like. TCUs may be configured to utilize a cellular network to provide passengers of a vehicle with a Wi-Fi hotspot.

SUMMARY OF THE DISCLOSURE

One aspect of the present disclosure is a roof structure for a motor vehicle. The structure includes an outer sheet of roof material, and a headliner positioned below the outer sheet of the material. The headliner may include an opening. The roof structure may further include an insulated space formed by a layer of insulation that is disposed below the outer sheet of roof material, and insulation extending around the insulated space. The insulated space may have a downwardly-facing opening that is aligned with the opening in the headliner. A telematics control unit (TCU) is disposed, at least partially, in the insulated space. The TCU is preferably configured to communicate with a cellar network or other wireless data source and provide Wi-Fi access within a passenger space of the vehicle. The roof structure further includes an electrically non-conductive grill extending across the opening in the headliner below the TCU. The grille has at least one opening therethrough to permit airflow between the insulated space and a passenger space below the headliner.

Embodiments of the first aspect of the present disclosure can include any one or a combination of the following features:

The grille may comprise a heat-conductive material.

The grille may be made of a polymer composite material including a thermoplastic polymer matrix having thermally conductive particles disposed therein.

The thermally conductive particles may comprise an electrically non-conductive material.

The thermally conductive particles may comprise one or more materials selected from the group consisting of boron nitride flakes, boron nitride platelets, and boron nitride agglomerates.

The thermally conductive particles may comprise boron nitride granulated platelets having an average diameter of about 200 μm.

The boron nitride granulated platelets may comprise about 30 percent of the polymer composite material by volume, and the thermoplastic polymer may further comprise polybutylene terephthalate (PBT).

The polymer composite material may further comprise a polypropylene adhesive tie layer to increase bond strength between the polymer matrix and the boron nitride granulated platelets.

The heat-conductive material of the grille may have a thermal conductivity of at least about 1.25 W/(m K).

The TCU may be spaced-apart from the layer of insulation to define a gap to permit airflow through the gap.

The grille may comprise a heat-conductive polymer composite material including a polymer matrix having thermally conductive particles disposed therein.

The TCU may be mounted to the grille whereby heat from the TCU is transferred directly into the grille.

The grille may include a central area having openings therethrough extending between upper and lower sides of the central area. The grille may further include at least one integrally-formed protrusion comprising a polymer composite material, wherein the protrusion extends upwardly from the upper side of the grille and contacts an upright side surface of the TCU to thereby transfer heat from the upright side surface directly into the protrusion. The TCU may be positioned directly above the central area of the grille.

The grille may comprise a central portion of a TCU housing, wherein the TCU housing further includes sidewalls extending upwardly around the central portion. The sidewalls may comprise thermoplastic polymer material that is integrally formed with the polymer matrix material using a two-shot injection molding process. The thermoplastic polymer material of the sidewalls is substantially free of thermally conductive particles.

The grille may include a peripheral flange that overlaps the headliner around the opening through the headliner.

The roof structure may further include a headliner reinforcement structure that is secured to the headliner around the opening through the headliner. The headliner reinforcement structure may include an upper web disposed between the outer sheet of roof material and the layer of insulation, and transverse sidewalls extending from a periphery of the upper web to an upper side of the headliner.

The roof structure may include at least one antenna mounted thereto, and a cable operably connecting the TCU to the antenna. The TCU may transmit wireless RF signals through the grille into the passenger space of the vehicle.

The layer of insulation and the insulation extending around the insulated space may both comprise foam. The layer of insulation may be substantially flat and define a perimeter. The insulation extending around the insulated space may comprise an upright sidewall structure having a ring shape in plan view, and an upward portion of the upright sidewall structure may be joined to the perimeter of the insulation extending around the insulated space.

Another aspect of the present disclosure is a motor vehicle including a roof structure having an outer layer and a headliner below the outer layer. A TCU is mounted to the roof structure directly above an opening in the headliner. A layer of insulation is disposed between the TCU and the outer layer to block transmission of heat from the outer layer to the TCU. The layer of insulation is spaced apart from the TCU to form a gap to permit airflow through the gap. A grille extends across the opening in the headliner. The grille is made of an electrically non-conductive polymer composite material comprising a polymer matrix and electrically non-conductive particles. The particles comprise a material having greater thermal conductivity than a thermal conductivity of the polymer matrix material.

Embodiments of the second aspect of the present disclosure can include any one or a combination of the following features:

The TCU may be mounted to the grille.

The grille may be integrally formed in an overhead console that extends downwardly below the headliner.

Another aspect of the present disclosure is a method of mounting a TCU in a roof structure of a motor vehicle. The method includes forming a thermally conductive polymer composite grille by: a) introducing polybutylene terephthalate (PBT) resin into an initial feed throat of an extruder having co-rotating screws in a melt and mix region of the extruder; b) adding boron nitride particles into molten polybutylene terephthalate (PBT) resin after the polybutylene terephthalate (PBT) resin has passed through the mix and melt region to form a molten polymer composite; c) injecting the molten polymer composite into a mold cavity; and d) solidifying the polymer composite to form a thermally conductive polymer composite grille having a plurality of openings therethrough. The method further includes securing a TCU to the thermally conductive polymer composite grille, and securing the thermally conductive polymer composite grille to the roof structure to form a gap between an upper surface of the TCU and a layer of insulation disposed below an outer layer of the roof structure.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein the term "or" is not an exclusive or. For example, an item including A or B may include A alone, B alone, or both A and B.

As used herein, the term "and/or," when used in a list of two or more items, means that any one of the listed items can be employed by itself, or any combination of two or more of the listed items can be employed. For example, if a composition component, or assembly, is described as containing components A and/or B and/or C, the composition component, or assembly, can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein the terms "the," "a," and "an," mean "at least one," and should not be limited to "only one" unless explicitly indicated to the contrary. Thus, for example, reference to "a component" includes embodiments having only one such component and embodiments having two or more such components unless the context clearly indicates otherwise.

Figure 1:
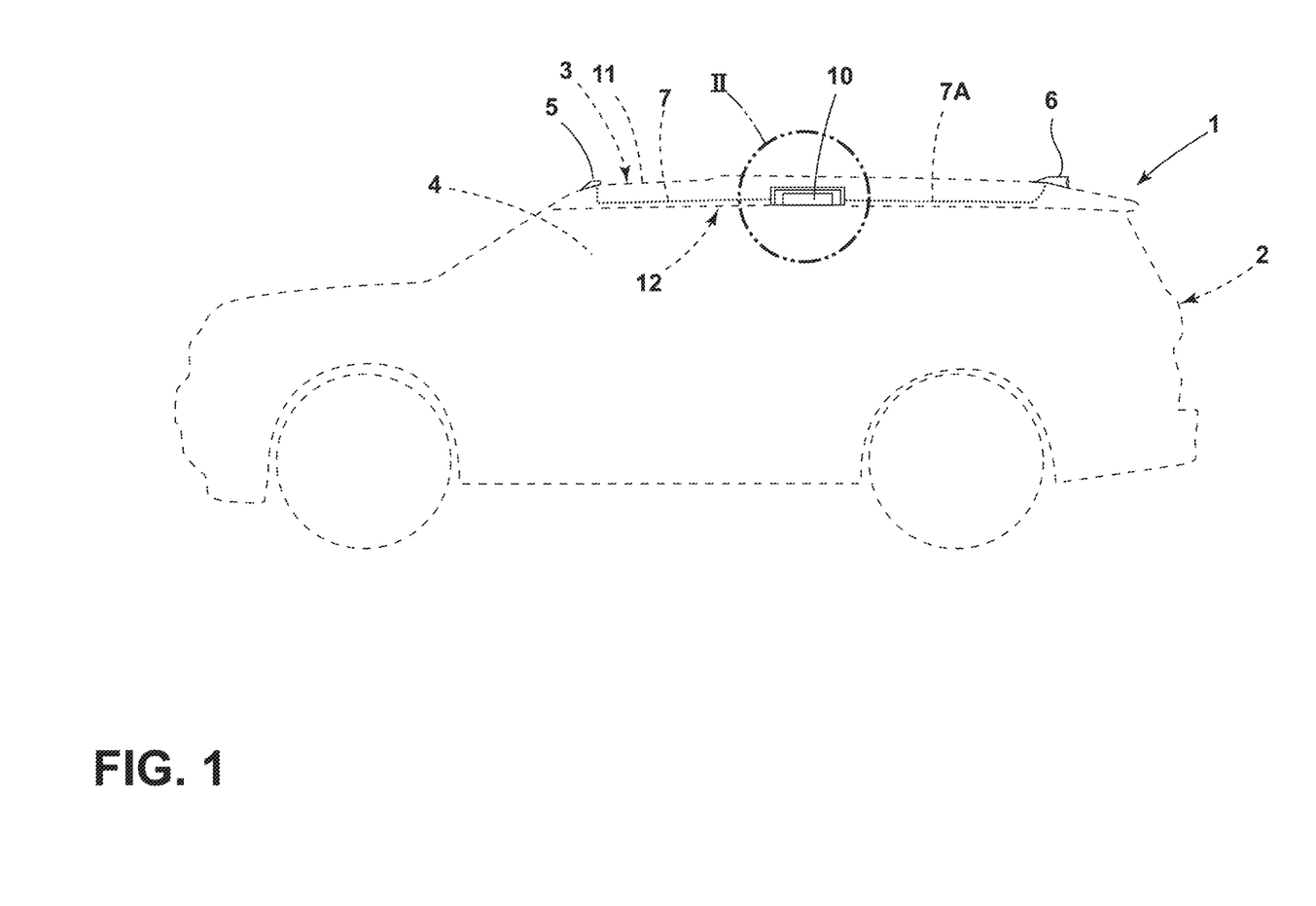
FIG. 1 is a partially schematic side-elevational view of a motor vehicle having a roof-mounted TCU according to one aspect of the present disclosure.

With reference to FIG. 1, a motor vehicle 1 includes a vehicle structure 2 including a roof structure 3, and a passenger compartment 4 that is generally below the roof structure 3. A telematics control unit (TCU) 10 is mounted to the roof structure 3. The TCU may comprise virtually any suitable TCU. Examples of TCUs are disclosed in U.S. Pat. Nos. 10,705,820; 10,547,502; 10,523,565; 10,318,247; and 10,242,509, the entire contents of each of the aforementioned patents are incorporated herein by reference. Motor vehicle 1 may include one or more antennas 5 and 6 that are operably connected to the TCU 10 by one or more lines such as coaxial cables 7, 7A. The TCU may be configured to communicate with a cellular network (or other wireless system) (e.g., one or more satellites), and transmit an RF signal within passenger compartment 4 to provide a Wi-Fi hotspot (access) for passengers in passenger compartment 4.

Figure 2:
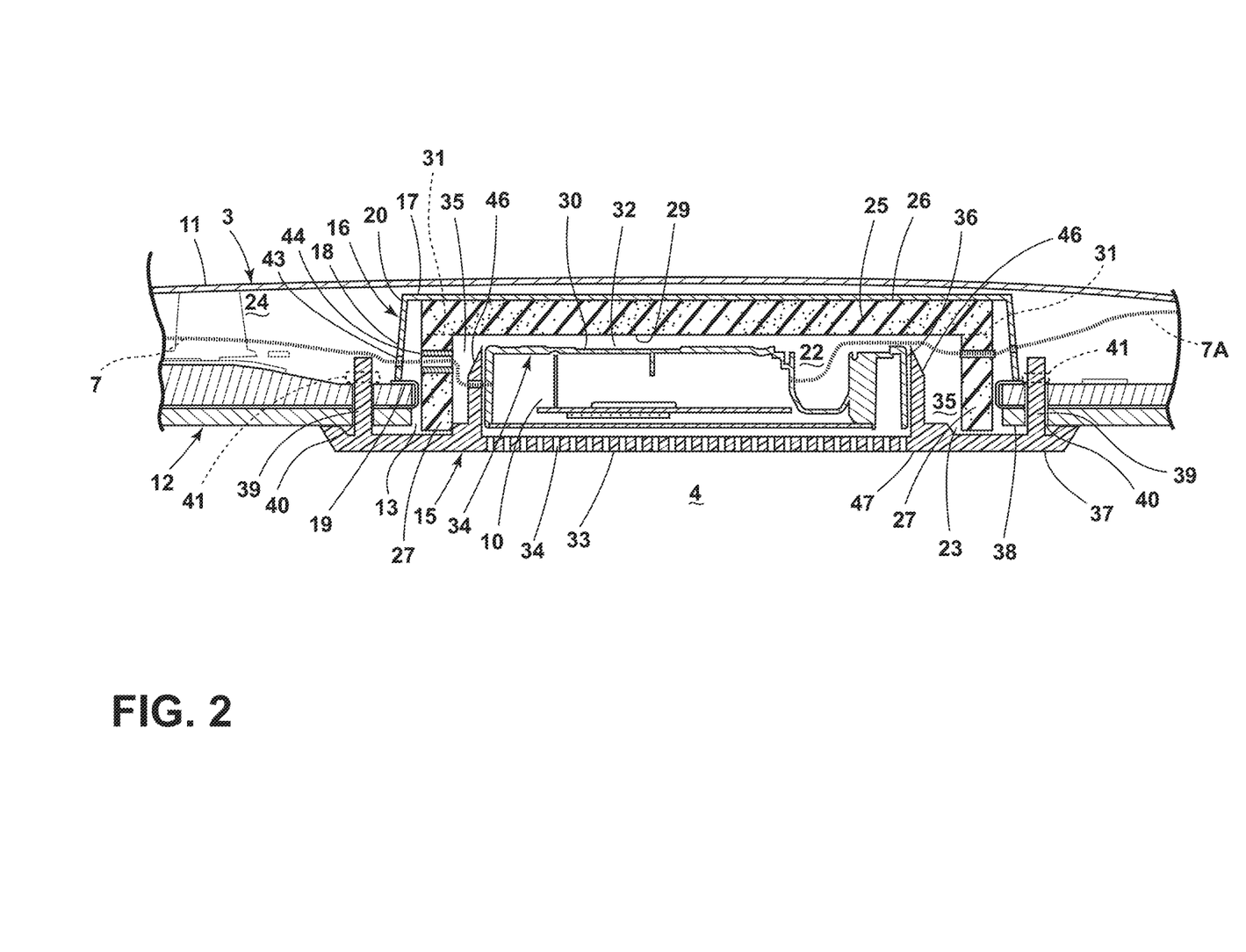
FIG. 2 is a partially schematic cross-sectional view of a portion of the roof structure of the motor vehicle of FIG. 1.

With further reference to FIG. 2, roof structure 3 may include an outer layer 11 and a headliner 12, and a space 24 between outer layer 11 and headliner 12. The outer layer 11 may comprise sheet metal or other suitable material (e.g., polymer, composite, etc.), and headliner 12 may comprise virtually any suitable headliner configuration. The headliner 12 includes an opening 13, and a grille 15 extends across opening 13. As discussed in more detail below, grille 15 may be made from a thermally conductive polymer composite material having thermally conductive particles disposed therein to transfer heat from TCU 10 to the passenger compartment 4. The material of grille 15 is preferably electrically non-conductive such that wireless signals produced by the TCU 10 pass through grille 15.

A headliner reinforcement structure 16 (see also FIG. 2) may include a planar upper web 17, and sidewalls 18 extending transversely from the planar upper web 17 and connecting to headliner 12 via a bracket or clip 19. The headliner reinforcement structure 16 may have a rectangular shape in plan view and the sidewalls 18 may extend around a perimeter 20 of web 17 whereby the headliner reinforcement structure 16 has a shallow rectangular shape (e.g., similar to an upside down pan). Headliner reinforcement structure 16 may be made from polymer, metal, or other suitable material.

Insulating material 25 is disposed below and inside headliner reinforcement structure 16 to form an insulated space 22 having a downwardly-facing opening 23 that is generally aligned with opening 13 of headliner 12. Insulating material 25 preferably comprises foam (e.g., closed cell foam) or other suitable material. The insulating material 25 may comprise foam material including an upper layer 26 that may be adhesively bonded to planar upper web 17 of headliner reinforcement structure 16. The insulating material 25 may further include sidewalls 27 that extend transversely from upper layer 26 and around the insulated space 22. Upper layer 26 and sidewalls 27 may comprise a one-piece integral structure, or the sidewalls 27 may comprise separate components that may be bonded to upper layer 26 at joints 31. The upper layer 26 of insulating material 25 has a lower surface 29 that is preferably spaced-apart from an upper surface 30 of TCU 10 to form a gap 32. Gap 32 may have a dimension of about 0.1-1.0 inches, or virtually any other size as required. The grille 15 may include a central portion 33 having a plurality of openings 34 therethrough to permit air to flow through the openings 34. Air can also flow through side gaps 35 between sides 36 of TCU 10 and sidewalls 27 of insulating material 25. Air can also flow through gap 32 and through side gaps 35 to provide convective heat transfer to thereby cool TCU 10 and prevent transfer of heat from outer layer 11 of roof structure 3 through upper layer 26 of insulating material 25. It will be understood that the size, shape, and number of openings 35 is not limited to any particular configuration. Grille 15 may have virtually any configurations and grille 15 does not necessarily need to be located directly below TCU 10.

Grille 15 may include a peripheral flange 37 that overlaps a peripheral edge portion 38 of headliner 12 adjacent opening 13 through headliner 12. Grille 15 may include a plurality of fasteners, such as bosses 39 (FIG. 2) that extend through openings 40 in headliner 12 to engage retainers or clips 41 to thereby secure the grille 15 to the headliner 12. As discussed above, one or more cables 7, 7A may be operably connected to the TCU 10. The cables 7, 7A may extend through grommets 43 and 44 to form a sealed pass-through of sidewall 18 of headliner reinforcement structure 16 and a sidewall 27 of insulating material 25. Grommets 43 and 44 may be configured to provide a seal to substantially prevent airflow between insulated space 22 and space 24 in roof structure 3 between outer layer 11 and headliner 12.

Figure 3:
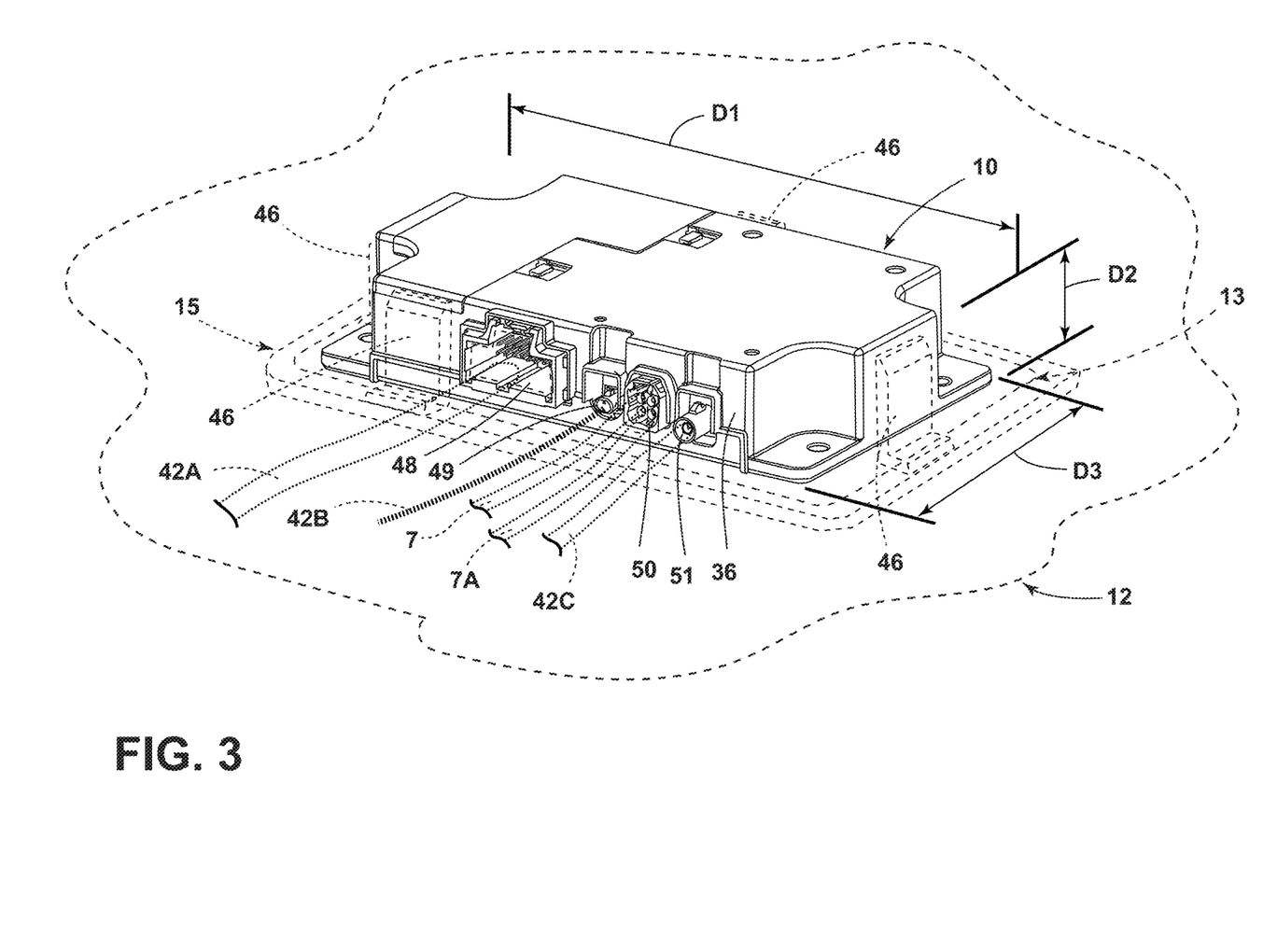
FIG. 3 is a partially schematic perspective view of the TCU and grille of FIG. 2.

Grille 15 may optionally include one or more integrally formed protrusions such as tabs 46 that extend upwardly directly adjacent upright side surfaces 36 of TCU 10 (see also FIG. 3). The tabs 46 may be formed integrally with grille 15 of thermally-conductive polymer composite material, and tabs 46 may be in direct contact with sides 36 of TCU 10 to thereby provide for heat flow from TCU 10 to a horizontal lower portion 47 of grille 15. The tabs 46 may also be configured to support and/or attach TCU 10 to the grille 15.

In further reference to FIG. 3, TCU 10 may have an overall length dimension "D1" of about 166 mm, a height D2 of about 32 mm, and a width D3 of about 100 mm. It will be understood that D1, D2, and D3 may vary significantly from these dimensions, and the present disclosure is not limited to a TCU 10 having any specific size, shape, or configuration. TCU 10 may also include a plurality of ports 48-51 that are configured to connect to lines or cables. Port 48 may comprise a wire harness connecting point for a wire harness 42A, and port 49 may comprise an Ethernet connecting point for the Ethernet cable 42B. Port 50 may comprise a coaxial cable bundle port for connecting one or more coaxial cables 7, 7A to antennas 5 and 6. Port 51 may comprise an antenna connection port that is configured to operably connect TCU 10 to an antenna that is internal to vehicle 1 via cable 42C. It will be understood that TCU 10 could have virtually any number and configuration of ports as required for a particular configuration.

Figure 4:
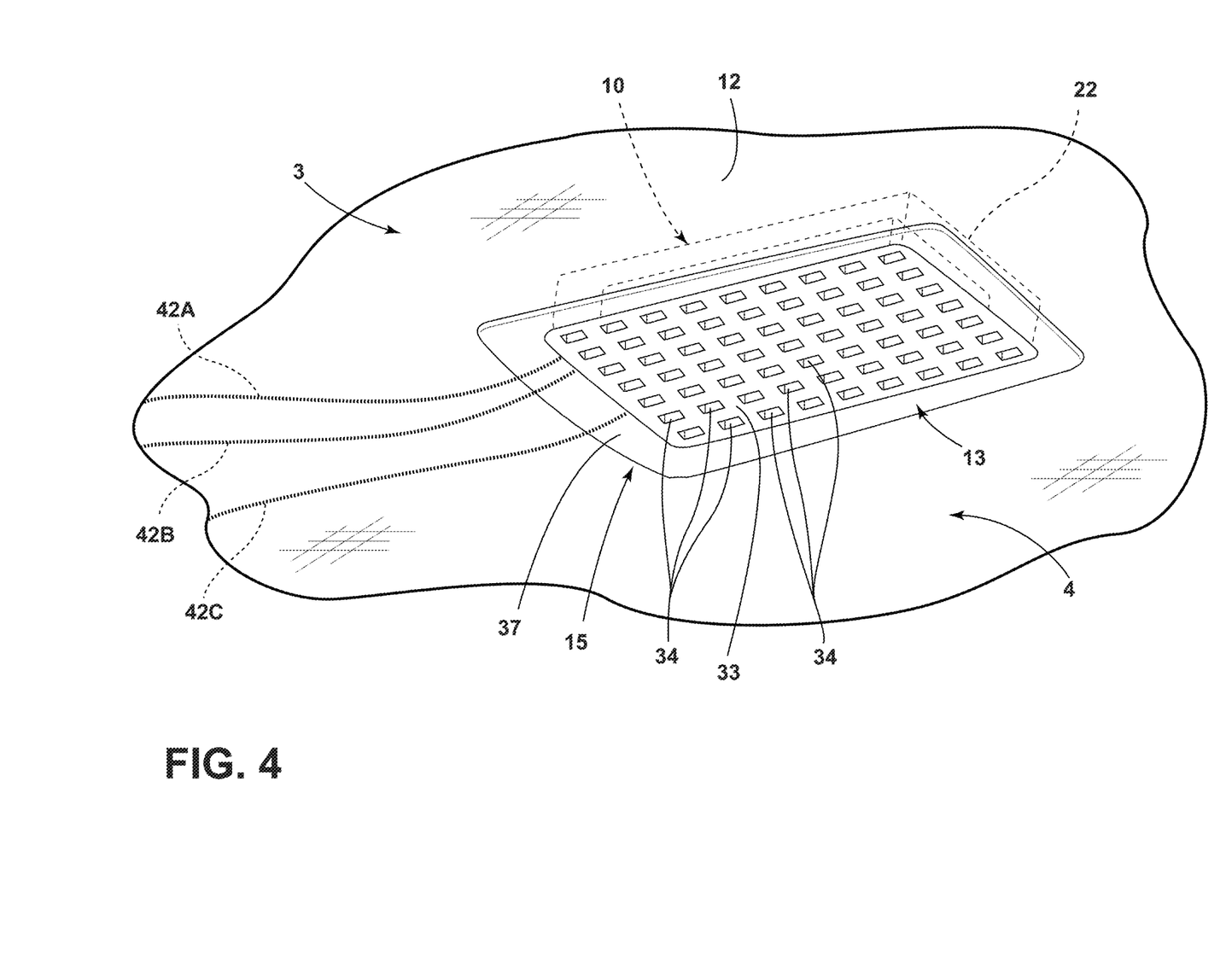
FIG. 4 is a partially schematic perspective view of the headliner and grille of FIG. 2.

With further reference to FIG. 4, the TCU 10 may be positioned directly above central portion 33 of grille 15 directly above openings 33 in grille 15. The grille 15 permits airflow through openings 33, yet blocks (at least partially) the view of TCU 10 from inside the passenger compartment 4 of motor vehicle 1.

The grille 15 may comprise a polymer composite material having a thermoplastic polymer matrix and thermally conductive particles disposed in the polymer matrix. The polymer matrix material may comprise virtually any suitable polymer, and the particles may comprise virtually any heat-conductive material, preferably having low or very low electrical conductivity. A preferred polymer is polybutylene terephthalate (PBT), and the thermally conductive particles preferably comprise boron nitride, which may be in the form of flakes, platelets, or agglomerates. In a preferred embodiment, the thermally conductive particles comprise granulated platelets of boron nitride having an average diameter of about 200 mm. Also, the granulated platelets may comprise about 30 percent of the polymer composite material by volume. However, it will be understood that virtually any volume percentage of thermally conductive particles may be utilized as required for a particular application. For example, the volume of the thermally conductive particles may comprise 5-50 percent, 10-40 percent, or 25-35 percent of the total volume of the polymer composite material.

The polymer composite material of grille 15 is preferably not electrically conductive to any significant degree, and the grille 15 does not therefore interfere with RF signals from TCU 10. This permits RF signals from TCU 10 to pass through the grille 15 into passenger compartment 4 in a substantially unimpeded manner. It will be understood that grille 15 may interfere with RF signals in a very minor or insubstantial manner. The thermally conductive particles in the polymer composite provide significantly increased thermal conductivity relative to conventional (non-composite) polymer materials to thereby transfer heat from the TCU 10 to the grille 15, and into air circulating through the passenger compartment 4 and through insulated space 22. Conventional polymers typically have a thermal conductivity of about 0.25 W(m K). However, the thermal conductivity of the polymer composite material of grille 15 is preferably about 1.25 W(m K) to provide significantly greater heat transfer from TCU 10 through grille 15. In general, the thermal conductivity of the polymer composite material of grille 15 is at least about 1.0 W(m K), but may be significantly higher than 1.25 W(m K) (e.g., 1.50 W(m K)).

As discussed in more detail below, the polymer composite material may further comprise additives such as a polypropylene resin providing an adhesive tie layer to bond the matrix material to the particles and increase the bond strength between the polymer matrix and the particles.

The thermal conductivity and ventilation provided by grille 15 provide for transfer of heat from TCU 10, and insulation 25 reduces transfer of heat from an exterior of vehicle 1 into insulated space 22. For example, if motor vehicle 1 is in a high temperature environment (e.g., the sun is shining directly on outer layer 11 of roof structure 3), the insulating material 25 prevents or significantly reduces heat transfer into insulated space 22, and grille 15 facilitates transfer of heat away from TCU 10 by conduction through the polymer composite material and by convection due to air circulation. Thus, the insulating material 25 and thermally conductive grille 15 prevent overheating of TCU 10.

Figure 5:
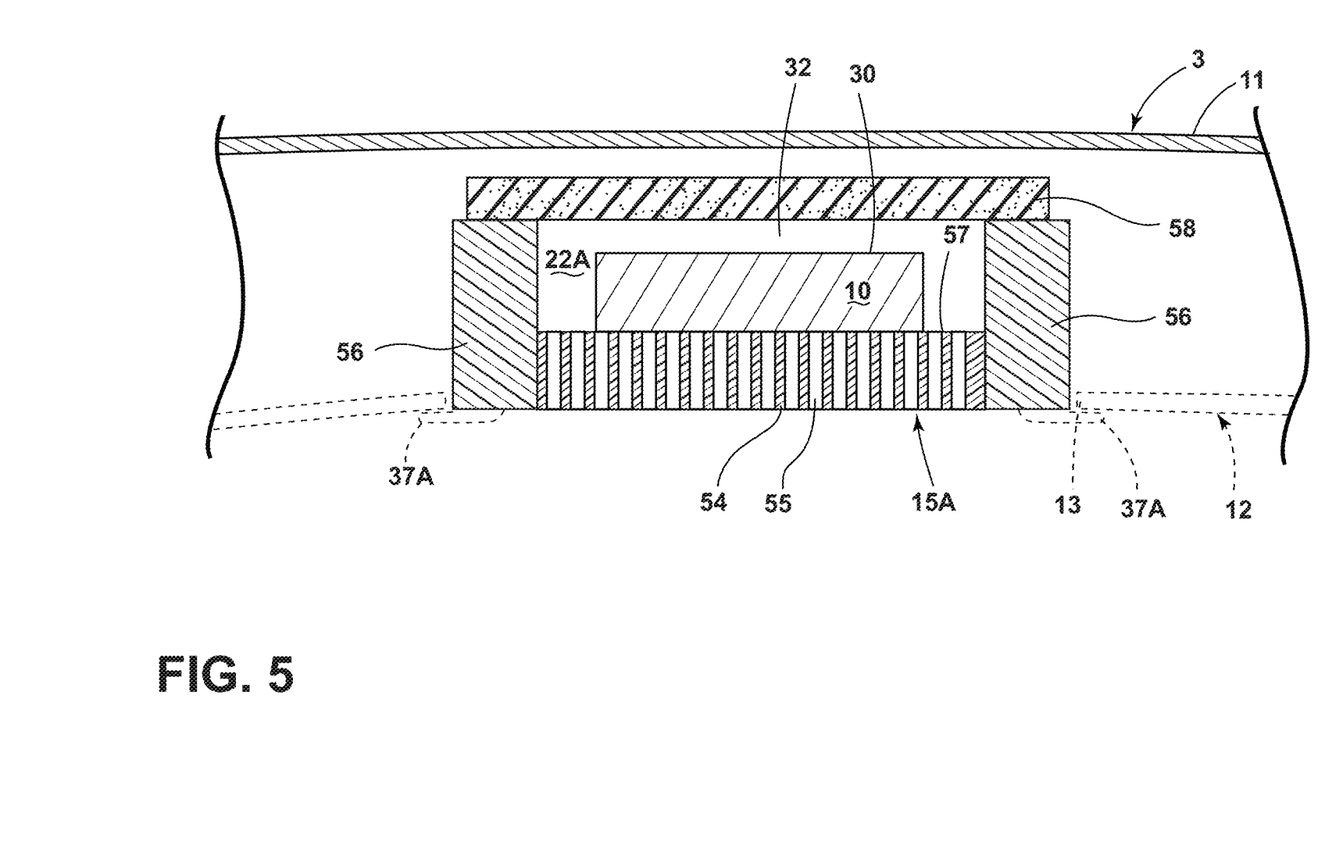
FIG. 5 is a cross-sectional schematic view of a roof structure and TCU housing according to another aspect of the present disclosure.

With further reference to FIG. 5, a grille 15A according to another aspect of the disclosure may include a central portion 54 having a plurality of openings 55 that is molded from a thermally conductive polymer composite material. The thermally conductive polymer composite material may have substantially the same composition as the polymer composite material, as discussed in more detail above in connection with FIGS. 1-4. The grille 15A further includes sidewalls 56 that are made of a polymer material that does not include thermally conductive particles. The grille 15A may be made utilizing a two-shot molding process, wherein the central portion 54 is molded from a polymer composite material, and the sidewalls 56 may be molded in a second molding shot. In this way, the sidewalls 56 may be integrally formed with the central portion 54, even though the sidewalls 56 do not include thermally conductive particles. In general, polymer composites including thermally conductive particles may be more costly, and the grille 15A therefore provides reduced cost due to the use of thermally conductive polymer material only in central portion 54. TCU 10 may be mounted directly to an upper surface 57 of central portion 54 to thereby transfer heat from TCU 10 into central portion 54 of grille 15A. Grille 15A may be mounted in opening 13 of headliner 12, and may optionally include flanges 37A that extend over an edge portion of headliner 12 adjacent opening 13. Grille 15A may be connected to headliner 12 utilizing bosses and clips (not shown) that are substantially identical to the bosses 39 and clips 41 that are discussed in more detail above in connection with FIG. 2. A sheet 58 of insulating material 25 may be positioned between outer layer 11 of roof structure 3 and upper surface of TCU 10 to form a gap 32 in substantially the same manner as discussed in more detail above in connection with FIGS. 1-4. Surface 30 of TCU 10 is preferably spaced apart from insulating sheet 58 to form a gap 32 to thereby provide for flow of air through insulated space 22A, around TCU 10, and through openings 55 of grille 15A.

Figure 6:
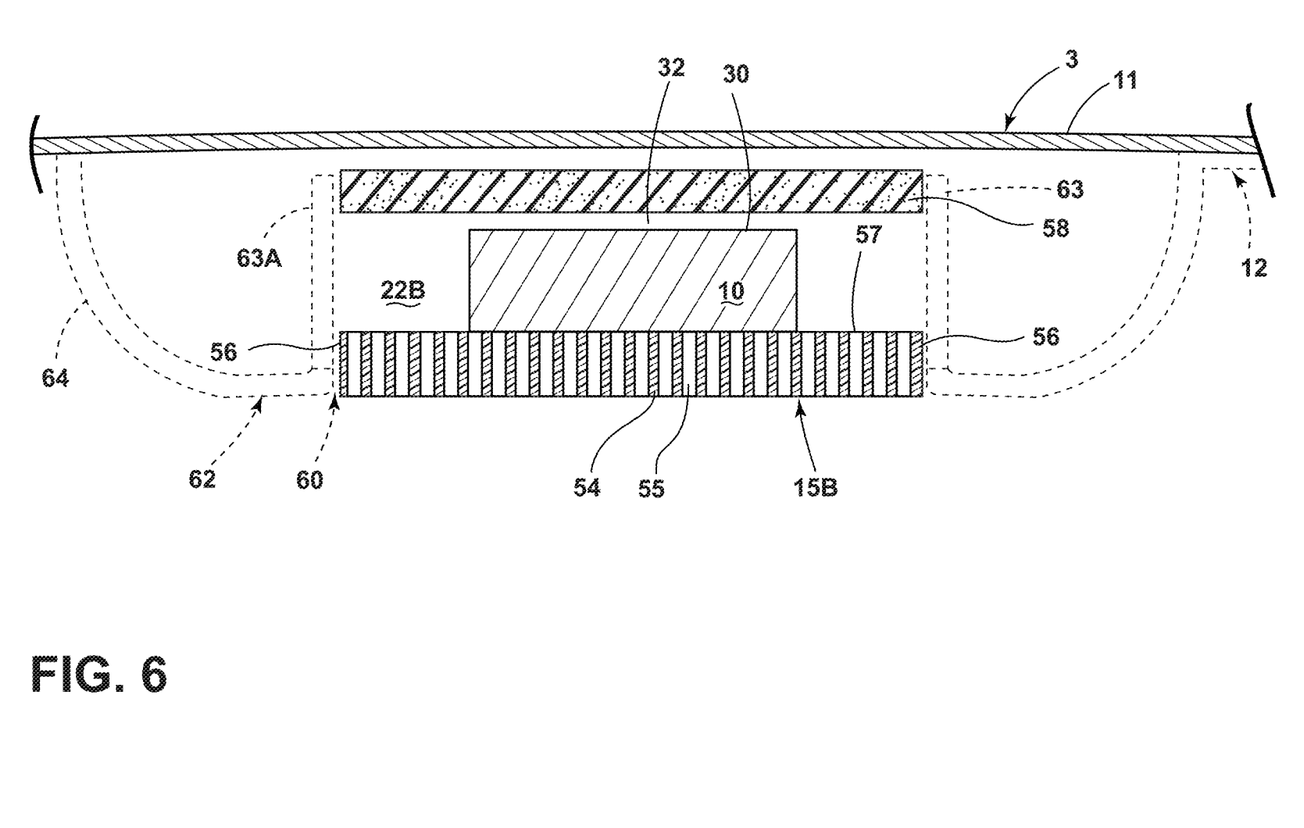
FIG. 6 is a partially schematic cross-sectional view of a roof structure of a motor vehicle according to another aspect of the present disclosure, wherein a TCU is mounted to a thermally conductive grille of an overhead console.

With further reference to FIG. 6, TCU 10 may also be mounted to a grille 15B mounted in an opening 60 of a center console 62. A sheet of insulating material 63 may be positioned above TCU 10 to form a gap 32 to permit airflow through openings 55 of grille 15B. Grille 15B may be made of a thermally conductive polymer composite material in a manner that is substantially similar to the grille 15 of FIGS. 1-4. The insulating material may include sidewalls 63A forming an insulating space 22B. Center console 62 may include a housing 64 that extends downwardly below headliner 12 in a manner that is substantially similar to known overhead consoles. The housing 64 may comprise a molded polymer material similar to that of known overhead consoles. Alternatively, the housing 64 may comprise a thermally conductive polymer composite of the type described in more detail above, and grille 15 may optionally be integrally-formed in housing 64.

Figure 7:
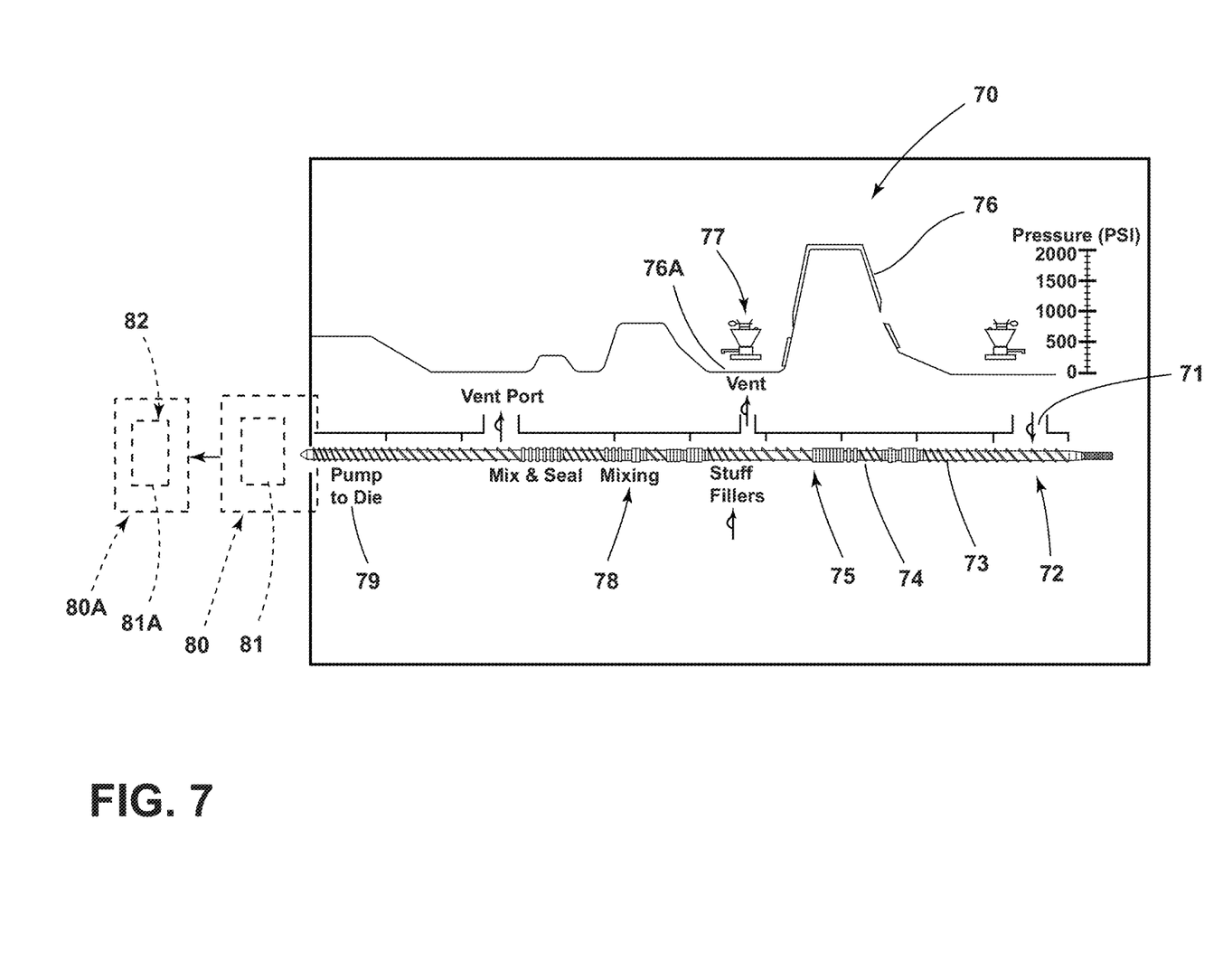
FIG. 7 is a schematic view of a molding process according to one aspect of the present disclosure.

With further reference to FIG. 7, a process 70 for molding grille 15 includes feeding a suitable thermoplastic resin such as polybutylene terephthalate (PBPT) resin along with additional (optional) ingredients such as a compatibilizer, antioxidants, flame retardants, and color concentrate into an initial feed throat 71 at a feed station of a twin screw extruding machine 75. The twin screw machine 75 includes co-rotating screws 73 that are configured to have a high level of sheer in a melt and mix region 74 of screw machine 75. The pressure line 76 of the polymer material in the screw machine 75 increases in the melt and mix region 74. Boron nitride particles 77 are added after the melt and mix region 74 of the extruder 75. The screws 73 are designed to impart a lower level of sheer into the molten material in the resin following melt and mix region 74. The lower pressure 76A reduces breakage of the boron nitride platelets. The molten composite material is then further mixed at section 78, and a pump 79 is provided to inject the molten composite material into a cavity 81 of a mold die 80. Cavity 81 has a shape corresponding to the grille 15 to thereby form a molded grille 15 upon solidification of the molten composite material. As discussed above, a grille 15A may include sidewalls 56 that do not include thermally conductive particles. If this construction is desired, a two-shot injection molding process may be utilized. Specifically, a first portion including a thermally conductive polymer material may be formed in a first mold cavity 81, and the first portion (e.g., central portion 54 of FIG. 5) may then be transferred to a second mold cavity 81A of a second mold 80A, and polymer material 82 that does not include thermally conductive particles may then be injected into the second cavity 81A to thereby form a grille 15A including integrally-formed thermally conductive and thermally non-conductive portions as discussed above in connection with FIG. 5.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A roof structure for a motor vehicle, comprising:
an outer sheet of roof material;
a headliner positioned below the outer sheet of roof material, wherein the headliner includes an opening;
an insulated space formed, by a layer of insulating material disposed below the outer sheet of roof material and insulating material extending around the insulated space, wherein the insulated space has a downwardly-facing opening that is aligned with the opening in the headliner;
a telematics control unit (TCU) disposed in the insulated space below the layer of insulating material, wherein the TCU is configured to communicate with a wireless network and provide Wi-Fi access within a passenger space of the vehicle; and
an electrically non-conductive grille extending across the opening in the headliner below the TCU, wherein the grille has at least one opening therethrough to permit airflow between the insulated space and a passenger space below the headliner, wherein the grille comprises a heat-conductive material, and wherein the TCU is mounted to the grille whereby heat from the TCU is transferred directly into the grille by conduction.

2. The roof structure of claim 1, wherein:
the headliner includes a downwardly facing planar surface extending around the opening of the headliner, and wherein no portion of the TCU projects below the planar surface of the headliner that extends around the opening.

3. The roof structure of claim 2, wherein:
the grille is made of a polymer composite material including a thermoplastic polymer matrix having thermally conductive particles disposed therein.

4. The roof structure of claim 3, wherein:
the thermally conductive particles comprise an electrically non-conductive material.

5. The roof structure of claim 4, wherein:
the thermally conductive particles comprise one or more materials selected from the group consisting of boron nitride flakes, boron nitride platelets, and boron nitride agglomerates.

6. The roof structure of claim 5, wherein:
the thermally conductive particles comprise boron nitride granulated platelets and have an average diameter of about 200 μm.

7. The roof structure of claim 6, wherein:
the boron nitride granulated platelets comprise about 25-35 percent of the polymer composite material by volume; and
the thermoplastic polymer comprises polybutylene terephthalate (PBT).

8. The roof structure of claim 7, wherein:
the polymer composite material further comprises a polypropylene in the form of an adhesive tie layer to increase bond strength between the polymer matrix and the boron nitride granulated platelets.

9. The roof structure of claim 2, wherein:
the heat-conductive material of the grille has a thermal conductivity of at least about 1.25 W(m K).

10. The roof structure of claim 1, wherein:
the TCU is spaced-apart from the layer of insulating material to define a gap configured to permit airflow through the gap above the TCU to provide convective heat transfer.

11. A roof structure for a motor vehicle, comprising:
an outer sheet of roof material;
a headliner positioned below the outer sheet of roof material, wherein the headliner includes an opening;
an insulated space formed by a layer of insulating material disposed below the outer sheet of roof material and insulating material extending around the insulated space, wherein the insulated space has a downwardly-facing opening that is aligned with the opening in the headliner;
a telematics control unit (TCU) disposed in the insulated space, wherein the TCU is configured to communicate with a wireless network and provide Wi-Fi access within a passenger space of the vehicle the TCU is spaced-apart from the layer of insulating material to define a gap configured to permit airflow through the gap to provide convective heat transfer;
an electrically non-conductive grille extending across the opening in the headliner below the TCU, wherein the grille has at least one opening therethrough to permit airflow between the insulated space and a passenger space below the headliner; and wherein
the grille comprises a heat-conductive polymer composite material including a polymer matrix having thermally conductive particles disposed therein; and
the TCU is mounted to the grille whereby heat from the TCU is transferred directly into the grille by conduction.

12. The roof structure of claim 11, wherein:
the grille includes a central area having at least one opening therethrough extending between upper and lower sides of the central area, the grille further including at least one integrally-formed protrusion comprising a polymer composite material extending upwardly from the upper side of the grille and contacting an upright side surface of the TCU to thereby transfer heat from the upright side surface directly into the protrusion;
and wherein the TCU is positioned directly above the central area of the grille.

13. The roof structure of claim 11, wherein:
the grille comprises a central portion of a TCU housing, wherein the TCU housing further includes sidewalls extending upwardly around the central portion, wherein the sidewalls comprise thermoplastic polymer material that is integrally formed with the polymer matrix material using a two-shot injection molding process, and wherein the thermoplastic polymer material of the sidewalls is substantially free of thermally conductive particles.

14. The roof structure of claim 1, wherein:
the grille includes a peripheral flange that overlaps the headliner around the opening through the headliner; and including:
a headliner reinforcement structure secured to the headliner around the opening through the headliner, the headliner reinforcement structure including an upper web disposed between the outer sheet of roof material and the layer of insulating material, and transverse sidewalls extending from a periphery of the upper web to an upper side of the headliner.

15. The roof structure of claim 1, including:
at least one antenna mounted to a rear portion the roof structure;
a cable operably connecting the TCU to the antenna, wherein a portion of the cable extends rearwardly to the at least one antenna through a space of the roof structure between the outer sheet of roof material and the headliner;
and wherein the TCU transmits wireless RF signals through the grille into the passenger space of the vehicle.

16. The roof structure of claim 1, wherein:
the layer of insulating material and the insulating material extending around the insulated space comprise foam, and wherein the insulated space is substantially flat and defines a perimeter, and wherein the insulating material extending around the insulated space comprises an upright sidewall structure having a ring shape in plan view, wherein an upper portion of the upright sidewall structure is joined to the perimeter of the layer of insulating material.

17. A motor vehicle comprising:
a roof structure having an outer layer and a headliner below the outer layer;
a grille;
a TCU mounted to the grille directly above an opening in the headliner;
a layer of insulating material between the TCU and the outer layer to block transmission of heat from the outer layer to the TCU, wherein the layer of insulating material is spaced apart from the TCU to form a gap to permit airflow through the gap; and
wherein the grille includes a horizontal lower portion extending across the opening in the headliner below the TCU, the horizontal lower portion including a plurality of openings therethrough directly below the TCU, wherein the grille is made of an electrically non-conductive polymer composite comprising a polymer matrix and electrically non-conductive particles, wherein the particles comprise a material having greater thermal conductivity than a thermal conductivity of the polymer matrix whereby heat from the TCU is transferred directly into the grille.

18. The motor vehicle of claim 17, wherein:
the grille includes at least one upright heat-conducting structure in direct contact with a side of the TCU, wherein the upright heat-conducting structure is integrally formed with the horizontal lower portion of the grille whereby heat from the TCU is conducted into the upright heat-conducting structure and into the horizontal lower portion of the grille from the upright heat-conducting structure.

19. The motor vehicle of claim 18, wherein:
the grille is integrally formed in an overhead console that extends downwardly below the headliner.

\* \* \* \* \*